UNITED STATES PATENT OFFICE.

NATHAN SULZBERGER, OF NEW YORK, N. Y.

PEPTONIZED VEGETABLE AND ANIMAL EXTRACT.

1,060,296.  Specification of Letters Patent.  Patented Apr. 29, 1913.

No Drawing.  Application filed November 26, 1910. Serial No. 594,346.

*To all whom it may concern:*

Be it known that I, NATHAN SULZBERGER, a citizen of the United States, residing at Hotel Netherland, New York city, in the county and State of New York, have invented new and useful Improvements in Peptonized Vegetable and Animal Extracts, of which the following is a specification.

My invention relates to a process of making an extract, consisting of a combination of peptonized animal and vegetable substance, fat, salt, and spices; and also to the product derived from this process. This product is to be used for all purposes for which at present beef extracts are used, as for instance, in making soup, bouillons, gravies, sauces, etc. The product may be either put up in more or less liquid form, in bottles, jars, etc., or in more or less solid form, pressed and cut in any desired shape and in a desired quantity sufficient for one or more portions.

Ordinary beef extract is to-day considered a product possessing small nutritious value, since the same does not contain, or not in any appreciable quantities, the valuable nourishment of the beef, from which it is prepared, principally lacking the albuminous constituents and fat of the beef. Therefore, beef extract prepared in the present way is scientifically not considered a food product, but simply a stimulant and appetizer. Since such extract is also generally and preferably made from lean beef the finished product is also practically free from fat, which forms one of our three food materials.

My process, consisting in combining peptonized vegetable and animal food product, particularly albuminous constituents of the same, with fat of either animal or vegetable origin, prepares an extract, which is not only rich in fat and albumin, but also contains the latter, since the same is peptonized, in a condition, where it is more easily assimilated in the body, its metabolism being more easily accomplished. This product is rendered even more palatable by the addition of salt and spices to suit the taste. Also fresh or dried vegetables, or the aromatic principles of the same, may be added for this purpose. The peptonization of the animal or vegetable product is produced according to any known method, as for instance, with hydro-chloric or other acid, ferments, etc., at ordinary or increased pressure. The animal and vegetable constituents (albumins) may also be primarily mixed and the mixture of the same peptonized. Any excess of acid used in the peptonizing process is of course neutralized before use of the product. As an example I make an extract by mixing together fifty pounds of peptonized vegetable albumin and fifty pounds of peptonized albumin from animal origin, adding about twenty-five pounds of salt, about two pounds of rendered fat and flavoring derived from fresh vegetables to suit taste.

The product can be put up either in liquid, semi-solid or solid form, with or without the addition of a binding medium, such as gelatin, tragacanth, etc., and in amounts sufficient for individuals, singular or plural portions. This product will keep for great length of time, particularly if sufficient salt has been added, which can readily be done as in most cases the product is diluted (as for instance in making a beef-tea by dissolving in boiling water) before use. Besides, or instead of adding salt, the keeping qualities of the product can be readily very materially increased, if suitably wrapped and packed, as for instance, in water-proof paper, tin-foil, etc. The product can be put up in any desired shape, such as cubes, etc.

The words "free from maltose formed during the process of peptonization" used in the following claims should not refer to those amounts of maltose in applicant's product which may be contained in the same, due to the amounts of starchy material which the albuminous product naturally contains.

I claim—

1. A process for making a highly nutritious beef and bouillon extract free from maltose formed during the process of peptonization, which comprises combining peptonized animal and vegetable substances.

2. A process for making a highly nutritious beef and bouillon extract free from maltose formed during the process of peptonization which comprises combining peptonized animal and vegetable albumin, fatty substances and salt.

3. A process for making a highly nutritious beef and bouillon extract free from maltose formed during the process of peptonization, which consists in combining peptonized animal and vegetable albumin, fat and spices, substantially as herein disclosed.

4. A combination comprising peptonized beef and vegetable albumin, free from maltose formed during the process of peptonization.

5. A combination of peptonized beef and vegetable albumin free from maltose formed during the process of peptonization, of the nature herein disclosed, with fat, salt and spices.

6. A combination of peptonized beef and vegetable albumin fat, salt and spices, free from maltose formed during the process of peptonization, which, when dissolved in boiling water, will form a brownish solution, having the appearance and flavor of beef tea, the surface of which is covered with small globules of a fatty material.

7. A process for preparing a meat and bouillon extract, free from maltose formed during the process of peptonization, of highly nutritious properties comprising peptonizing a mixture of animal and vegetable albumin.

8. A process for preparing beef and bouillon extract of highly nutritious value, free from maltose formed during the process of peptonization, substantially as disclosed, consisting in peptonizing a mixture of animal and vegetable albumin, adding thereto fat, and suitably salting, seasoning and spicing the same.

9. A product composed of peptonized vegetable and animal albumin, fat, salt and spices, free from maltose formed during the process of peptonization, which, when dissolved in boiling water, will produce a cup of bouillon.

10. An extract free from maltose formed during the process of peptonization and containing albumin both from animal and vegetable origin, which has been rendered soluble in water by peptonizing the same, fat, salt and spices, which, when dissolved in boiling water, will produce a cup of bouillon.

11. The new composition of matter containing peptonized animal albumin and a substantial amount of water soluble vegetable albumin.

12. The new composition of matter containing peptonized animal albumin, a substantial amount of water soluble vegetable albumin, and a preservative.

13. A process for peptonizing a mixture of animal and vegetable albumin consisting in treating such mixture with an acid suitable for producing a peptonized food product.

14. A process for producing a mixture of peptonized albumin of animal and vegetable origin free from maltose, consisting in mixing albumin from animal and from vegetable origin and treating the mixture with peptonizing agents.

15. The composition of matter comprising a concentrated extract of a mixture of peptonized animal albumin and material amounts of peptonized vegetable albumin free from maltose derived from added starchy material.

16. The process of peptonizing an extract to be used in making soups, gravies, etc., comprising peptonized vegetable and peptonized animal albumin consisting in peptonizing substantially pure albuminous matter from animal or vegetable origin by its mixture with an acid suitable for peptonizing a food product.

17. The process of producing a substantially pure mixture of peptonized animal and vegetable albumin, which consists in peptonizing a mixture of animal and vegetable albumin with such a peptonizing medium as will produce peptones without forming maltose from starchy material which the albumin, being peptonized, may contain.

18. The composition of matter containing peptonized animal and peptonized vegetable albumin, fat, seasoning and spice.

19. As an article of manufacture a product to be used for making bouillon, gravies, beef-tea, etc., formed into the shape of a cube, comprising a mixture of peptonized vegetable and animal albumin, practically free from maltose formed during the process of peptonization.

20. A concentrated composition of matter for food, containing peptonized animal albumin, and a substantial amount of soluble vegetable albumin.

21. The new composition of matter in substantially solid form containing water soluble peptonized animal albumin, and a substantial amount of water soluble vegetable albumin.

22. The composition of matter comprising peptonized animal albumin and peptonized vegetable albumin practically free from maltose formed during the process of peptonization out of a starchy material added to such albumin prior to its peptonization.

NATHAN SULZBERGER.

Witnesses:
JOHN SCHMITT,
GEORGE H. OREAR.